(12) United States Patent
Okamoto et al.

(10) Patent No.: US 8,570,891 B2
(45) Date of Patent: Oct. 29, 2013

(54) WIRELESS COMMUNICATION SYSTEM, CONTROL APPARATUS, COMMUNICATION METHOD SWITCHING METHOD, AND PROGRAM

(75) Inventors: Tsukasa Okamoto, Shizuoka (JP); Masahiko Yahagi, Tokyo (JP)

(73) Assignees: NEC Corporation, Tokyo (JP); NEC Access Technica, Ltd., Shizuoka (JP)

( * ) Notice: Subject to any disclaimer, the term of this patent is extended or adjusted under 35 U.S.C. 154(b) by 248 days.

(21) Appl. No.: 13/055,816

(22) PCT Filed: Sep. 9, 2009

(86) PCT No.: PCT/JP2009/065704
§ 371 (c)(1),
(2), (4) Date: Jan. 25, 2011

(87) PCT Pub. No.: WO2010/035635
PCT Pub. Date: Jan. 4, 2010

(65) Prior Publication Data
US 2011/0116412 A1 May 19, 2011

(30) Foreign Application Priority Data

Sep. 26, 2008 (JP) ................................ 2008-247755

(51) Int. Cl.
*H04J 1/16* (2006.01)
*H04L 12/28* (2006.01)
(52) U.S. Cl.
USPC ........................... 370/252; 370/338; 370/400
(58) Field of Classification Search
USPC ................... 370/252, 338, 352, 400
See application file for complete search history.

(56) References Cited

U.S. PATENT DOCUMENTS

| 2005/0255892 A1* | 11/2005 | Wong et al. ................. 455/562.1 |
| 2006/0121935 A1* | 6/2006 | Dalsgaard et al. ......... 455/552.1 |
| 2008/0182605 A1* | 7/2008 | Yamaoka et al. ............. 455/507 |
| 2008/0228942 A1* | 9/2008 | Lor et al. ....................... 709/238 |

(Continued)

FOREIGN PATENT DOCUMENTS

| CN | 1867118 A | 11/2006 |
| JP | 2007068128 A | 3/2007 |

(Continued)

OTHER PUBLICATIONS

International Search Report for PCT/JP2009/065704 mailed Nov. 7 2009.

(Continued)

*Primary Examiner* — Andrew Lee (57) ABSTRACT

A wireless communication system includes a plurality of base stations that are capable of switching to either a first communication method or a second communication method and that carry out wireless communication with terminals by the switched communication method and a control apparatus that manages the plurality of base stations. The control apparatus includes an acquisition unit that acquires information of throughput of each of the plurality of base stations and a switching instruction unit that instructs switching of the current communication method to each of the plurality of base stations when there is a base station in which throughput drops within a fixed interval among the plurality of base stations, and that further instructs re-switching to the communication method that preceded switching to base stations in which throughput dropped from before to after switching communication method among the plurality of base stations.

9 Claims, 4 Drawing Sheets

(56) References Cited

U.S. PATENT DOCUMENTS

| | | | |
|---|---|---|---|
| 2009/0286534 A1* | 11/2009 | Garg et al. | 455/432.1 |
| 2009/0310698 A1* | 12/2009 | Agarwal et al. | 375/267 |
| 2010/0278117 A1* | 11/2010 | Sharma et al. | 370/329 |
| 2010/0304738 A1* | 12/2010 | Lim | 455/426.1 |
| 2011/0231492 A1* | 9/2011 | Wen | 709/206 |
| 2012/0287859 A1* | 11/2012 | Ji et al. | 370/328 |
| 2013/0003706 A1* | 1/2013 | Kezys | 370/331 |

FOREIGN PATENT DOCUMENTS

| | | |
|---|---|---|
| JP | 2007251941 A | 9/2007 |
| JP | 2007295344 A | 11/2007 |
| JP | 2008067066 A | 3/2008 |

OTHER PUBLICATIONS

Chinese Office Action for CN Application No. 200980138168.6 issued on May 6, 2013 with English Translation.

* cited by examiner

WIRELESS COMMUNICATION SYSTEM, CONTROL APPARATUS, COMMUNICATION METHOD SWITCHING METHOD, AND PROGRAM

TECHNICAL FIELD

The present invention relates to a wireless communication system, a control apparatus, a communication method switching method, and a program.

BACKGROUND ART

Wireless LAN (Local Area Network) communication is now widespread as a wireless communication technology. In a system realized by a wireless LAN, TE (Terminal Equipment), which is a terminal for use in a wireless LAN, is able to connect with a network by way of wireless communication realized by a wireless LAN that is carried out with a wireless LAN base station.

In recent years, WiMAX (Worldwide Interoperability for Microwave Access) communication is receiving attention as a new wireless communication technology. WiMAX communication offers the advantage of extremely high speed with communication speeds of 20 Mbps and greater even though realized by wireless communication.

In addition, a base station has been recently proposed as a base station for wireless communication that is capable of switching among a plurality of communication methods, one example being a base station disclosed in Patent Document 1 that is capable of switching to either Wireless LAN communication or W-WCDMA (Wideband Code Division Multiple Access) communication.

According to current trends, it is believed there will be an increasing need in the wireless LAN base station described hereinabove for enabling switching to WiMAX communication that is carried out with a MS (Mobile Station) that is a WiMAX terminal.

LITERATURE OF THE PRIOR ART

Patent Documents
Patent Document 1: JP 2007-068128 A

SUMMARY OF THE INVENTION

Problem to be Solved by the Invention

When a wireless LAN base station is to have a configuration such that it is capable of switching to either Wireless LAN communication or WiMAX communication, the throughput of the wireless LAN base station fluctuates greatly depending on how the switching method is realized.

For example, when the wireless LAN base station is switched to WiMAX communication, the throughput remains low without change if there are few MS present in the vicinity of the wireless LAN base station. However, if there are many TE in the vicinity in this case, switching the wireless LAN base station to wireless LAN communication is believed to increase throughput.

Switching the communication method of a wireless LAN base station is therefore crucial to increasing the throughput of a wireless LAN base station and thus increasing efficiency of wireless LAN communication and WiMAX communication.

It is therefore an object of the present invention to provide a wireless communication system, a control apparatus, a communication method switching method, and a program that can achieve greater efficiency of wireless LAN communication and WiMAX communication by switching the communication method of a base station.

Means for Solving the Problem

The wireless communication system of the present invention includes a plurality of base stations that are capable of switching to either a first communication method or a second communication method and that carry out wireless communication with terminals by the switched communication method, and a control apparatus that manages the plurality of base stations; wherein:

each of the plurality of base stations includes:
a first communication unit that carries out wireless communication by the first communication method;
a second communication unit that carries out wireless communication by the second communication method;
a switch unit that switches the communication unit used in wireless communication to either the first communication unit or the second communication unit according to instructions from the control apparatus, and
a throughput measurement unit that measures the throughput of its own station and transmits information of the throughput that was measured to the control apparatus;

the control apparatus includes:
an acquisition unit that acquires information of throughput from each of the plurality of base stations; and
a switching instruction unit that, when there is among the plurality of base stations a base station in which throughput drops within a fixed interval, instructs switching of the current communication method to each of the plurality of base stations, and further, instructs re-switching to the communication method that preceded switching to, among the plurality of base stations, base stations in which throughput drops from before to after switching of the communication method.

The control apparatus of the present invention manages a plurality of base stations that are capable of switching to either a first communication method or a second communication method and that carry out wireless communication with terminals by a communication method that was switched, and includes:
an acquisition unit that acquires information of throughput of each of the plurality of base stations; and
a switching instruction unit that, when there is, among the plurality of base stations, base stations in which throughput drops within a fixed interval, instructs switching of the current communication method to each of the plurality of base stations, and further, instructs re-switching to the communication method that preceded switching to, among the plurality of base stations, base stations in which throughput drops from before to after switching of the communication method.

The communication method switching method of the present invention is a communication method switching method for switching the communication method of a plurality of base stations in a control apparatus that manages the plurality of base stations that are capable of switching to either a first communication method or a second communication method and that carry out wireless communication with terminals by a communication method that is switched, the communication method switching method including:
an acquisition step of acquiring information of throughput of each of the plurality of base stations;
a switching instruction step of, when there is among the plurality of base stations a base station in which throughput drops within a fixed interval, instructing switching of the current communication method to each of the plurality of base stations; and a re-switching instruction step of further instructing re-switching to the communication method that preceded switching to, among the plurality of base stations, base stations in which throughput drops from before to after switching communication method.

The program of the present invention causes a control apparatus, which manages a plurality of base stations that are capable of switching to either a first communication method or a second communication method and that carry out wireless communication with terminals by a switched communication method, to execute:

an acquisition procedure of acquiring information of throughput of each of the plurality of base stations;

a switch instruction procedure of, when there is among the plurality of base stations a base station in which throughput drops within a fixed interval, instructing switching of the current communication method to each of the plurality of base stations; and a re-switching instruction procedure of further instructing re-switching to the communication method that preceded switching to base stations in which throughput from before to after switching communication method drops among the plurality of base stations.

Effect of the Invention

In the present invention, when there is a base station in which throughput drops within a fixed time interval among the plurality of base stations, the control apparatus instructs each of the plurality of base stations to switch the current communication method, and further, instructs re-switching to the communication method that preceded switching to base stations in which throughput drops from before to after switching of the communication method among the plurality of base stations.

Because the throughput of each base station can be increased by thus switching and re-switching the communication method in each base station, the present invention can obtain the effect of enabling greater efficiency of wireless LAN communication and WiMAX communication.

BEST MODE FOR CARRYING OUT THE INVENTION

A best mode of carrying out the present invention is next described with reference to the accompanying drawings.

In the present exemplary embodiment, a case is described as an example in which the base stations are wireless LAN base stations provided with WiMAX communication functions and are capable of switching to either a wireless LAN communication or WiMAX communication.

Figure 1:
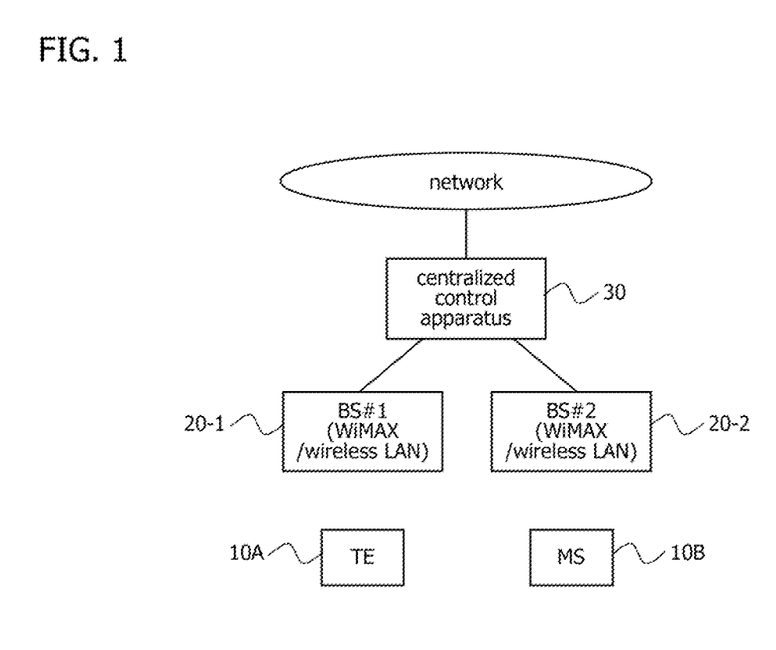
FIG. 1 is a block diagram showing the configuration of the wireless communication system of an exemplary embodiment of the present invention.

As shown in FIG. 1, the wireless communication system of the present exemplary embodiment includes: terminal equipment (hereinbelow abbreviated "TE") 10A for a wireless LAN, terminal (hereinbelow abbreviated "MS") 10B for WiMAX, base station (hereinbelow abbreviated "BS") (#1 and #2) 20-1 and 20-2 that are wireless LAN base stations provided with WiMAX communication functions, and centralized control apparatus 30.

In the interest of simplifying the explanation, one TE 10A, one MS 10B, and two BS (#1 and #2) 20-1 and 20-2 are shown in FIG. 1, but the present invention is not limited to these numbers. For example, the number of BS could be plural.

BS (#1 and #2) 20-1 and 20-2 are capable of switching to either WiMAX communication or wireless LAN communication, and further, carry out wireless communication with MS 10B when switched to WiMAX communication and carry out wireless communication with TE 10A when switched to wireless LAN communication.

Centralized control apparatus 30 performs the centralized management of BS (#1 and #2) 20-1 and 20-2.

The internal configurations of BS (#1 and #2) 20-1 and 20-2 and centralized control apparatus 30 are next described.

Figure 2:
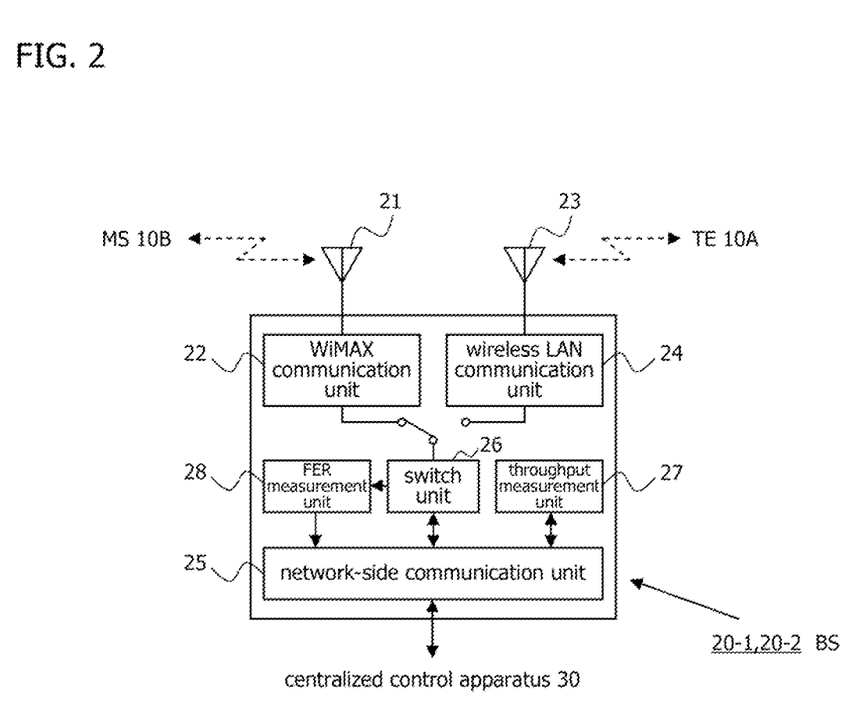
FIG. 2 is a block diagram showing the configuration of the base station shown in FIG. 1.

As shown in FIG. 2, BS (#1 and #2) 20-1 and 20-2 each include: antenna 21 for WiMAX, WiMAX communication unit 22, antenna 23 for wireless LAN, wireless LAN communication unit 24, network-side communication unit 25, switch unit 26, throughput measurement unit 27, and FER (Frame Error Rate) measurement unit 28.

WiMAX communication unit 22 carries out wireless communication by means of WiMAX communication with MS 10B by way of WiMAX antenna 21.

Wireless LAN communication unit 24 carries out wireless communication by means of wireless LAN communication with TE 10A by way of wireless LAN antenna 23.

Network-side communication unit 25 carries out communication with centralized control apparatus 30.

Switch unit 26 switches the communication unit used in wireless communication to either WiMAX communication unit 22 or wireless LAN communication unit 24 according to instructions from centralized control apparatus 30.

Throughput measurement unit 27 measures throughput that represents the data transfer amount per second (units: Mbps) between centralized control apparatus 30 and its own station and transmits information of the measured throughput to centralized control apparatus 30 by way of network-side communication unit 25. The throughput measurement method can employ a known method, and a detailed explanation is therefore here omitted.

FER measurement unit 28 measures the FER (units: %) of received frames that are received from MS 10B when switched to WiMAX communication unit 22 by switch unit 26, measures the FER of received frames that are received from TE 10A when switched to wireless LAN communication unit 24, and transmits information of the measured FER to centralized control apparatus 30 by way of network-side communication unit 25. The measurement method of FER can employ a known method and a detailed explanation is therefore here omitted.

Figure 3:
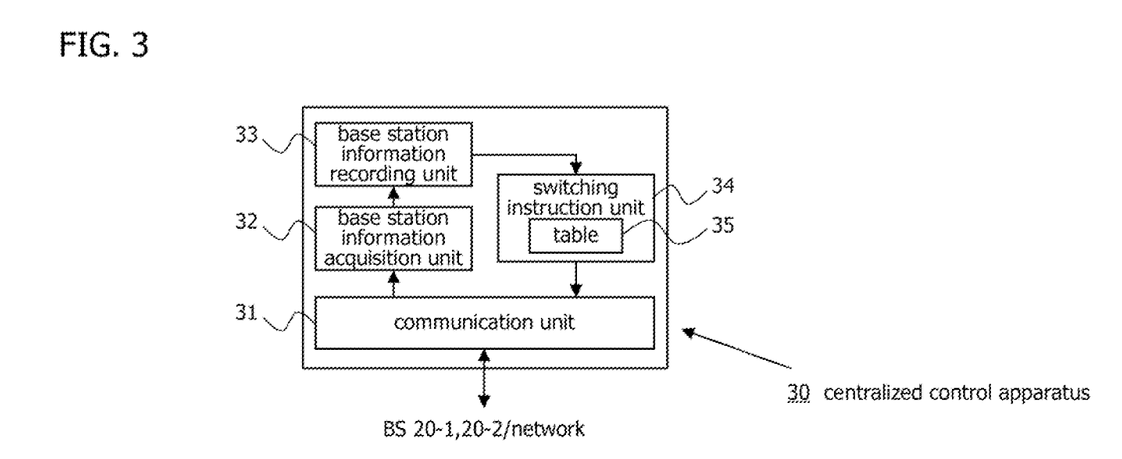
FIG. 3 is a block diagram showing the configuration of the centralized control apparatus shown in FIG. 1.

As shown in FIG. 3, centralized control apparatus 30 includes: communication unit 31, base station information acquisition unit 32, base station information recording unit 33, and switching instruction unit 34.

Communication unit 31 performs communication with BS (#1 and #2) 20-1 and 20-2 and other devices (not shown) on the network.

Base station information acquisition unit 32 acquires information of throughput and FER that is received from each of BS (#1 and #2) 20-1 and 20-2 and stores the information in base station information recording unit 33.

Switching instruction unit 34 monitors the throughput of each of BS (#1 and #2) 20-1 and 20-2 at fixed intervals, and when there is a BS that experiences a drop in throughput within a fixed interval, instructs each of BS (#1 and #2) 20-1 and 20-2 to switch the current communication method.

Figure 4:
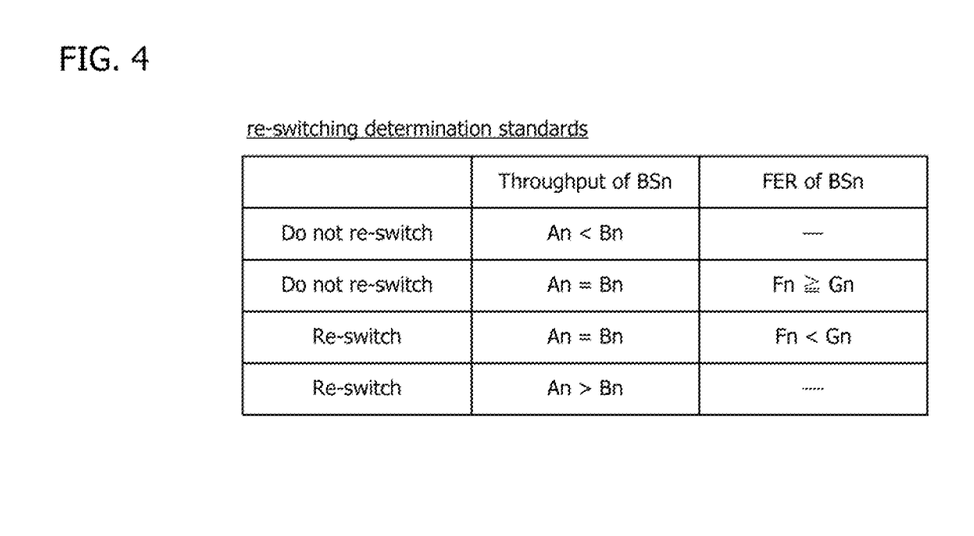
FIG. 4 is an explanatory view of a table that shows re-switching determination standards used by the switching instruction unit shown in FIG. 3.

Switching instruction unit 34 further has table 35 such as shown in FIG. 4, and after switching of the current communication method, instructs a specific BS based on table 35 to re-switch to the communication method that preceded switching. Table 35 of FIG. 4 will be described hereinbelow.

More specifically, if there is a BS in which throughput drops from before to after switching of the communication method among BS (#1 and #2) 20-1 and 20-2, switching instruction unit 34 instructs re-switching to that BS.

In addition, if there is a BS in which throughput is equal but FER increases from before to after switching of communication method among BS (#1 and #2) 20-1 and 20-2, switching instruction unit 34 also instructs re-switching to that BS.

Figure 5:
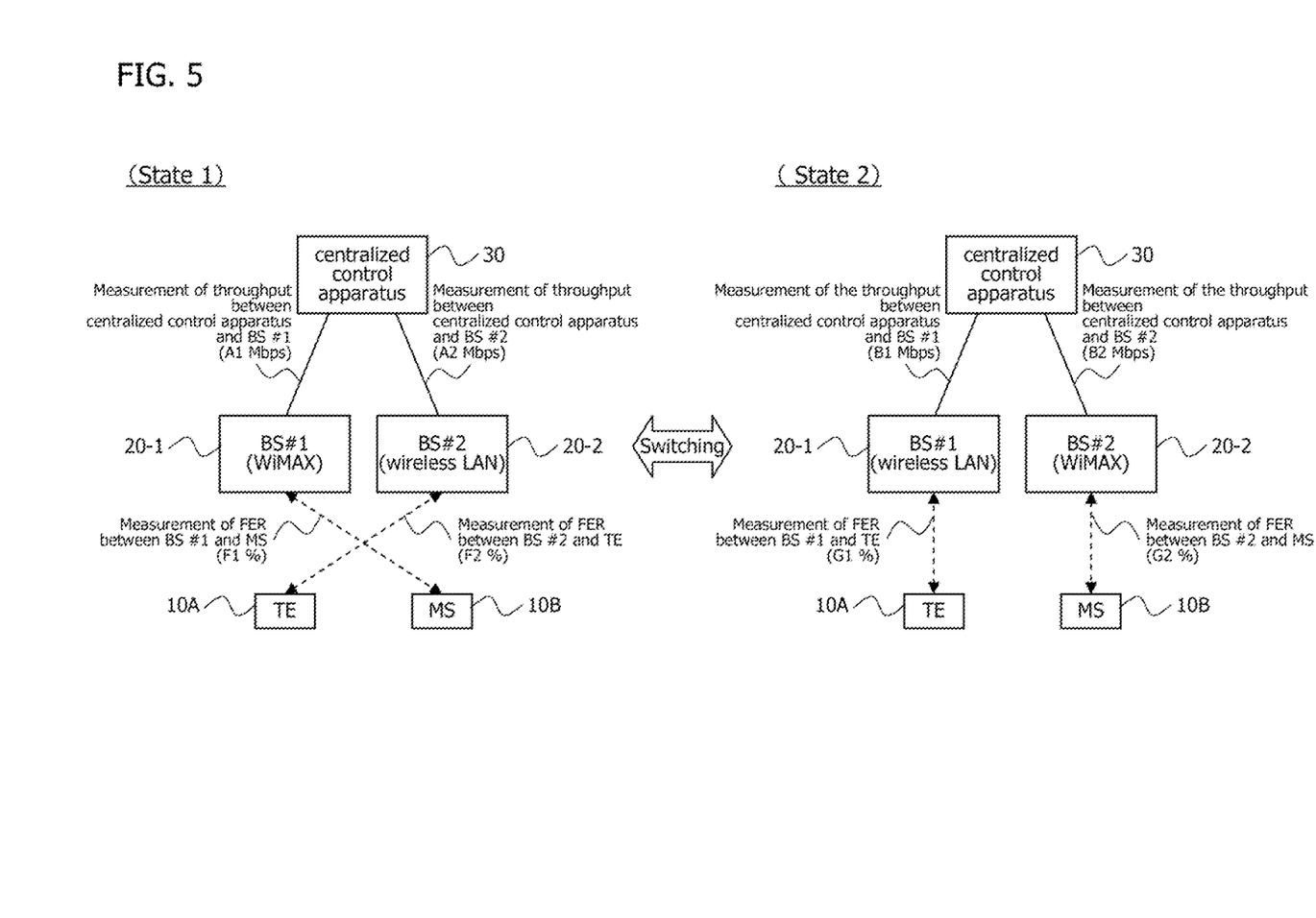
FIG. 5 is a view for describing the operations of the wireless communication system shown in FIG. 1.

The operations of the wireless communication apparatus of the present exemplary embodiment are next described with reference to FIG. 5.

A state is first assumed in which BS (#1) 20-1 is performing WiMAX communication and BS (#2) 20-2 is performing wireless LAN communication (State 1)

In this case, WiMAX communication unit 22 in BS (#1) 20-1 is performing wireless communication with MS 10B. Throughput measurement unit 27 measures the throughput (A1 (Mbps)) with centralized control apparatus 30 and transmits this information to centralized control apparatus 30, and FER measurement unit 28 measures the FER (F1 (%)) with MS 10B and transmits this information to centralized control apparatus 30.

In contrast, wireless LAN communication unit 24 in BS (#2) 20-2 performs wireless communication with TE 10A. Throughput measurement unit 27 measures the throughput (A2 (Mbps)) with centralized control apparatus 30 and transmits this information to centralized control apparatus 30, and FER measurement unit 28 measures the FER (F2 (%)) with TE 10A and transmits this information to centralized control apparatus 30.

In centralized control apparatus 30, switching instruction unit 34 monitors the throughput of BS (#1 and #2) 20-1 and 20-2 at fixed intervals and determines whether there is a BS in which throughput drops within a fixed interval. As the method of determining a "drop" in throughput, a method can be used in which, for example, the value at the start time of a fixed interval is compared with the value at the end time of the fixed interval and a "drop" is determined when the value of the end time is smaller than the value of the start time by at least a threshold value.

When there is a BS in which throughput drops, switching instruction unit 34 instructs switching of the current communication method to BS (#1 and #2) 20-1 and 20-2. The state thus transitions to a state in which BS (#1) 20-1 is switched to wireless LAN communication and BS (#2) 20-2 is switched to WiMAX communication (State 2).

In BS (#1) 20-1 in this case, wireless LAN communication unit 24 carries out wireless communication with TE 10A. Throughput measurement unit 27 measures the throughput (B1 (Mbps)) with centralized control apparatus 30 and transmits this information to centralized control apparatus 30, and FER measurement unit 28 measures the FER (G1 (%)) with TE 10A and transmits this information to centralized control apparatus 30.

In BS (#2) 20-2, in contrast, WiMAX communication unit 22 carries out wireless communication with MS 10B. Throughput measurement unit 27 measures the throughput (B2 (Mbps)) with centralized control apparatus 30 and transmits this information to centralized control apparatus 30, and FER measurement unit 28 further measures the FER (G2 (%)) with MS 10B and transmits this information to centralized control apparatus 30.

At this time, switching instruction unit 34 in centralized control apparatus 30 determines whether throughput from before to after switching of communication method corresponds to "increase," "drop," or "equal" for each BS (#1 and #2) 20-1 and 20-2. As the method of determining throughput, a method can be used in which, for example, the values from before to after switching are compared and "increase" is determined when the value after switching is greater than the value before switching by at least a threshold value, "drop" is determined when the value after switching is smaller than the value before switching by at least a threshold value, and "equal" is determined when neither condition applies.

Switching instruction unit 34 further determines to which of "increase" "drop," and "equal" the FER from before to after switching of communication method corresponds for each of BS (#1 and #2) 20-1 and 20-2. The method of determining FER can employ a method similar to the method for throughput.

Switching instruction unit 34 next determines based on table 35 shown in FIG. 4 whether re-switching to the communication method that preceded switching is necessary for each of BS (#1 and #2) 20-1 and 20-2.

BS (#1) 20-1 is here offered as an example.

If the throughput from before to after switching from WiMAX communication to wireless LAN communication is "drop," i.e., if A1>B1, switching, instruction unit 34 determines to carry out re-switching to WiMAX communication.

Alternatively, in some cases, the throughput from before to after switching from WiMAX communication to wireless LAN communication is "equal," i.e., A1=B1, but the FER is "increase," i.e., F1<G1. In such cases, the throughput does not change, but from the standpoint of greater efficiency of wireless communication, the state before switching is considered preferable. In this case, switching instruction unit 34 determines re-switching to WiMAX communication.

In other cases, switching instruction unit 34 determines not to perform re-switching to WiMAX communication.

Based on the above-described determination results, switching instruction unit 34 then instructs re-switching to the BS among BS (#1 and #2) 20-1 and 20-2 for which the performance of re-switching was determined.

However, when all of BS (#1 and #2) 20-1 and 20-2 are consolidated to WiMAX communication or to wireless LAN communication, even though greater efficiency of wireless communication may be achieved relating to the communication method of consolidation, terminals for the other communication method are unable to carry out wireless communication because there is no BS that is switched to the other communication method.

To circumvent this state, when instructing re-switching results in a state in which all of BS (#1 and #2) 20-1 and 20-2 are consolidated to WiMAX communication or to wireless LAN communication, switching instruction unit 34 either halts instruction or instructs re-switching to the BS in which throughput by the consolidated communication method is lowest such that a communication method other than the consolidated communication method is adopted.

In the present exemplary embodiment as described hereinabove, when there is a BS in which throughput has dropped within a fixed interval among BS (#1 and #2) 20-1 and 20-2, centralized control apparatus 30 instructs switching of the current communication method to each BS (#1 and #2) 20-1 and 20-2, and further, instructs re-switching to the communication method that preceded switching to, among BS (#1 and #2) 20-1 and 20-2, the BS in which the throughput from before to after switching the communication method drops dropped.

The switching and re-switching of communication methods in each BS (#1 and #2) 20-1 and 20-2 thus enables an increase of throughput of each BS (#1 and #2) 20-1 and 20-2, whereby greater efficiency of wireless LAN communication and WiMAX communication can be achieved.

In the present exemplary embodiment, centralized control apparatus 30 instructs re-switching to the communication method that preceded switching to, among BS (#1 and #2) 20-1 and 20-2, BS in which the throughput from before to after switching of communication method is equal but the FER increases.

The switching and re-switching of communication methods in each BS (#1 and #2) 20-1 and 20-2 thus enables the decrease of FER even when the throughput of each BS (#1 and #2) 20-1 and 20-2 cannot be increased, whereby greater efficiency of wireless LAN communication and WiMAX communication can be achieved.

In the present exemplary embodiment, when centralized control apparatus 30 has instructed re-switching that results in the consolidation of all BS (#1 and #2) 20-1 and 20-2 to WiMAX communication or to wireless LAN communication, centralized control apparatus 30 either instructs re-switching or halts instructions to BS in which throughput is lowest in the consolidated communication method such that this BS employs a communication method other than the consolidated communication method.

In this way, the consolidation of all BS (#1 and #2) 20-1 and 20-2 in WiMAX communication or wireless LAN communication can be prevented.

Although the present invention has been described hereinabove with reference to an exemplary embodiment, the present invention is not limited to the above-described exemplary embodiment. The constitution and details of the present invention are open to various modifications within the scope of the present invention that will be clear to one of ordinary skill in the art.

The method that is implemented in centralized control apparatus 30 of the present invention may be applied in a program for execution by a computer. Alternatively, such a program can be stored on a recording medium and can be provided to external devices by way of a network.

This application is the Natiional Phase of PCT/JP2009/065704filed Sept. 9, 2009, which is based on and claims the benefit of priority from Japanese Patent Application No. 2008-247755, filed on Sep. 26, 2008, the disclosure of which is incorporated herein in its entirety by reference.

What is claimed is:

1. A wireless communication system that includes a plurality of base stations that are capable of switching to either a first communication method or a second communication method and that carry out wireless communication with terminals by the switched communication method, and a control apparatus that manages said plurality of base stations; wherein:

each of said plurality of base stations includes:
a first communication unit that carries out wireless communication by said first communication method;
a second communication unit that carries out wireless communication by said second communication method;
a switch unit that switches the communication unit used in wireless communication to either said first communication unit or said second communication unit according to instruction from said control apparatus, and
a throughput measurement unit that measures throughput of its own station and transmits information of throughput that was measured to said control apparatus; and
said control apparatus includes:
an acquisition unit that acquires information of throughput from each of said plurality of base stations; and
a switching instruction unit that, when there is among said plurality of base stations a base station in which throughput drops within a fixed interval, instructs switching of the current communication method to each of said plurality of base stations, and further, instructs re-switching to the communication method that preceded switching to, among said plurality of base stations, base stations in which throughput dropped from before to after switching of the communication method,
wherein when all of said plurality of base stations are consolidated to the first communication method or to the second communication method upon said re-switching, said switching instruction unit instructs said re-switching or halts instruction to the base station in which throughput is lowest by the consolidated communication method such that that base station adopts a communication method other than the consolidated communication method.

2. The wireless communication system as set forth in claim 1, wherein:

each of said plurality of base stations further comprises a frame error rate measurement unit that measures the frame error rate of its own station and transmits information of the frame error rate that was measured to said control apparatus;
said acquisition unit further acquires information of the frame error rate from each of said plurality of base stations; and
said switching instruction unit instructs re-switching to the communication method that preceded switching to, among said plurality of base stations, base stations in which throughput from before to after switching communication method is equal but in which the frame error rate has increased.

3. The wireless communication system as set forth in claim 1, wherein:

said first communication method is a WiMAX (Worldwide Interoperability for Microwave Access) communication method; and
said second communication method is a wireless LAN (Local Area Network) communication method.

4. A control apparatus that manages a plurality of base stations that are capable of switching to either a first communication method or a second communication method and that carry out wireless communication with terminals by a communication method that was switched, comprising:

an acquisition unit that acquires information of throughput of each of said plurality of base stations; and
a switching instruction unit that, when there is, among said plurality of base stations, a base station in which throughput drops within a fixed interval, instructs switching of the current communication method to each of said plurality of base stations, and further, instructs re-switching to the communication method that preceded switching to, among said plurality of base stations, base stations in which throughput dropped from before to after switching of the communication method, wherein, when all of said plurality of base stations are consolidated to the first communication method or to the second communication method upon instruction of said re-switching, said switching instruction unit instructs said re-switching or halts instruction to the base station in which throughput is lowest by the consolidated communication method such that that base station adopts a communication method other than the consolidated communication method.

5. The control apparatus as set forth in claim 4, wherein:
said acquisition unit further acquires information of the frame error rate of each of said plurality of base stations, and
said switching instruction unit instructs re-switching to the communication method that preceded switching to, among said plurality of base stations, base stations in which throughput from before to after switching communication method is equal but in which the frame error rate has increased.

6. The control apparatus as set forth in claim 4, wherein:
said first communication method is a WiMAX communication method; and
said second communication method is a wireless LAN communication method.

7. A communication method switching method in a control apparatus that manages a plurality of base stations that are capable of switching to either a first communication method or a second communication method and that carry out wireless communication with terminals by the communication method that is switched for switching communication methods of said plurality of base stations, said communication method switching method comprising:
an acquisition step of acquiring information of throughput of each of said plurality of base stations;
a switching instruction step of, when there is among said plurality of base stations a base station in which throughput drops within a fixed interval, instructing switching of the current communication method to each of said plurality of base stations; and
a re-switching instruction step of further instructing re-switching to the communication method that preceded switching to, among said plurality of base stations, base stations in which throughput dropped from before to after switching communication method, wherein:
said first communication method is a WiMAX communication method; and
said second communication method is a wireless LAN communication method.

8. The communication method switching method as set forth in claim 7, wherein:
in said acquisition step, information of the frame rate error in each of said plurality of base stations is also acquired; and
in said re-switching instruction step, among said plurality of base stations, base stations in which throughput from before to after switching of communication method is equal but the frame error rate increases are instructed to re-switch to the communication method that preceded switching.

9. The communication method switching method as set forth in claim 7, wherein:
in said re-switching instruction step, when all of said plurality of base stations are consolidated to the first communication method or to the second communication method upon instruction of said re-switching, said re-switching instruction is implemented or instruction is halted to the base station in which throughput is lowest by the consolidated communication method such that that base station adopts a communication method other than the consolidated communication method.

\* \* \* \* \*